United States Patent [19]

Fujishiro

[11] Patent Number: 5,481,419
[45] Date of Patent: Jan. 2, 1996

[54] CASSETTE HOLDER MOVING MECHANISMS

[75] Inventor: Takeshi Fujishiro, Asaka, Japan

[73] Assignee: Fuji Photo Film Co., Ltd., Kanagawa, Japan

[21] Appl. No.: 141,884

[22] Filed: Oct. 27, 1993

[30] Foreign Application Priority Data

Oct. 28, 1992 [JP] Japan .................................. 4-290070
Dec. 7, 1992 [JP] Japan .................................. 4-326613

[51] Int. Cl.⁶ .......................... G11B 5/008; G11B 5/027
[52] U.S. Cl. ........................................ 360/96.5; 360/85
[58] Field of Search ..................... 74/440, 96.5, 96.1, 74/96.6, 85, 95

[56] References Cited

FOREIGN PATENT DOCUMENTS

| 4220703 | 1/1993 | Germany | 360/96.5 |
|---|---|---|---|
| 6314364 | 1/1983 | Japan . | |
| 59-221859 | 12/1984 | Japan | 360/96.5 |
| 62-250542 | 10/1987 | Japan | 360/96.5 |
| 63-206984 | 8/1988 | Japan | 360/96.5 |
| 2183457 | 7/1990 | Japan | 360/96.6 |

*Primary Examiner*—Stuart S. Levy
*Assistant Examiner*—William J. Klimowicz
*Attorney, Agent, or Firm*—Sughrue, Mion, Zinn, Macpeak & Seas

[57] ABSTRACT

In a magnetic recording and reproduction apparatus in which a cassette holder 11 is supported movably relative to a slide chassis 15 by two moving mechanism 16 and 17, the number of teeth of a pinion 40 at the moving mechanism 16 side is increased compared to a pinion 41 at the moving mechanism 17 side to prevent the cassette holder from coming up at the moving mechanism 16 side at the descending end of the cassette holder 11 to obtain a stable holding force. Further, racks 38 and 39 engaging with the pinions 40 and 41 at the descending end position of the cassette holder 11 is increased in tooth thickness to reduce backlash between the racks 38 and 39 and the pinions 40 and 41 at the descending end of the cassette holder 11, thereby obtaining improved operability.

8 Claims, 11 Drawing Sheets

CASSETTE HOLDER MOVING MECHANISMS

BACKGROUND OF THE INVENTION

1. Field of the Invention

This invention relates to cassette holder moving mechanisms for vertically moving a cassette holder holding a cassette case that is held substantially in a horizontal position in a magnetic recording and reproduction apparatus in which the cassette holder is movably supported on a slide chassis.

2. Description of the Background Art

Among magnetic recording and reproduction apparatus, a so-called 8-mm video apparatus uses a magnetic tape. In such an 8-mm video apparatus, the slide chassis can hold a cassette case in which a wound magnetic tape is disposed. The slide chassis can be moved by a built-in vertical moving mechanism to an eject position where the cassette holder is ejected out from the video main unit, and to a play position by a slide mechanism. At the play position, the magnetic tape can be pulled out from the cassette case to run for recording or reproduction.

The cassette holder is vertically moved relative to the slide chassis by moving mechanisms provided on two opposing sides so that the surfaces of the cassette case are moved in parallel.

The cassette holder provides vertical and substantially parallel movement due to the moving mechanism provided on the opposing sides. Therefore, if the force on one of the moving mechanisms is biased, the cassette holder does not provide movement in parallel, and the setting of the cassette tends to be unstable. Furthermore, since a lock mechanism for fixing the descending end position of the cassette holder is provided at only one side of the moving mechanisms, the other side of the cassette holder tends to be moved up by a counter-force. Furthermore, when both moving mechanisms are synchronized by a rack and pinion mechanism, movement of the pinion is small relative to vertical movement of the arm in a condition where the arm is nearly horizontal, that is, close to a cassette holder locking condition. As a result, there is a problem in that a backlash between the rack and pinion tends to produce a dead zone to the vertical movement.

SUMMARY OF THE INVENTION

In accordance with the present invention, there is provided a magnetic recording and reproduction apparatus comprising a cassette holder for holding a box-type cassette case having a wound magnetic tape, a slide chassis slidably provided in the main unit of the magnetic recording and reproduction apparatus for holding the cassette holder in a condition where the surfaces of the cassette case are vertically moved in parallel, and moving mechanisms individually provided over the cassette holder and the slide chassis at both sides of the vertical moving direction of the cassette holder. Each moving mechanism has two arms which are rotatable with respect to each other at an intermediate portion, one end of each arm is supported on the cassette holder and the other end is supported on the slide chassis. A rack and a pinion engaging with the rack are provided at one end of each arm, a connecting rod is rotatably supported on the cassette holder, and pinions are disposed individually at both ends of the connecting rod.

Furthermore, the two moving mechanisms are connected by a universal mechanism. A first of the two moving mechanisms has a lock mechanism for locking the moving mechanism at a descending end position of the cassette holder. The second of the two moving mechanisms has an acceleration mechanism for accelerating the vertical movement of the second moving mechanism relative to the first moving mechanism.

There is further provided according to the present invention a magnetic recording and reproduction apparatus comprising a cassette holder for holding a box-type cassette case having a wound magnetic tape, a slide chassis slidably provided in the main unit of the magnetic recording and reproduction apparatus for holding the cassette holder in a condition where the surfaces of the cassette case are vertically moved in parallel, and two moving mechanisms individually provided between the cassette holder and the slide chassis at both sides of the cassette holder, characterized in that each moving mechanism has two arms which are rotatable with respect to each other at an intermediate portion, one end of each arm is supported on the cassette holder and the other end supported on the slide chassis, a rack and a pinion engaging with the rack are provided at one end of each arm, a connecting rod is rotatably supported on the cassette holder, pinions are disposed individually at both ends of the connecting rod, and the thickness of the rack engaging with the pinion at a descending end position of the cassette holder is greater than the thickness of the rack engaging with the pinion at an ascending end position of the cassette holder.

The cassette holder is vertically moved by rotation of the two arms of the moving mechanisms. When the arms rotate, the connecting rod is rotated through the rack and pinion, the arms at both sides of the cassette holder move in synchronization with each other, and both moving mechanisms operate almost at the same speed. The cassette holder is locked at the descending end position by the lock mechanism, and the side having no lock mechanism is prevented by the accelerating mechanism from moving up.

Furthermore, since the tooth width of the rack engaging with the pinion at the descending end position of the cassette holder is increased, backlash between the rack and pinion at the descending end position can be decreased to reduce the appearance of a dead zone at the descending end position of the cassette holder.

DESCRIPTION OF THE PREFERRED EMBODIMENTS

The magnetic recording and reproduction apparatus having the cassette holder moving mechanisms according to the present invention will now be described.

In the present embodiment, an 8-mm video apparatus equipped with a reel brake drive mechanism as a magnetic recording and reproduction apparatus will be described. In this 8-mm video apparatus, the cassette holder can be protruded out from the video main unit by a moving mechanism, supported on the slide chassis, and slid to the play position relative to a base chassis of the video main unit. Furthermore, in the present embodiment, the front portion is the side where the cassette case is inserted into the cassette holder, and the rear portion is the reverse side.

In the Figures, various members related to driving the magnetic tape provided on the slide chassis are omitted.

Figure 1:
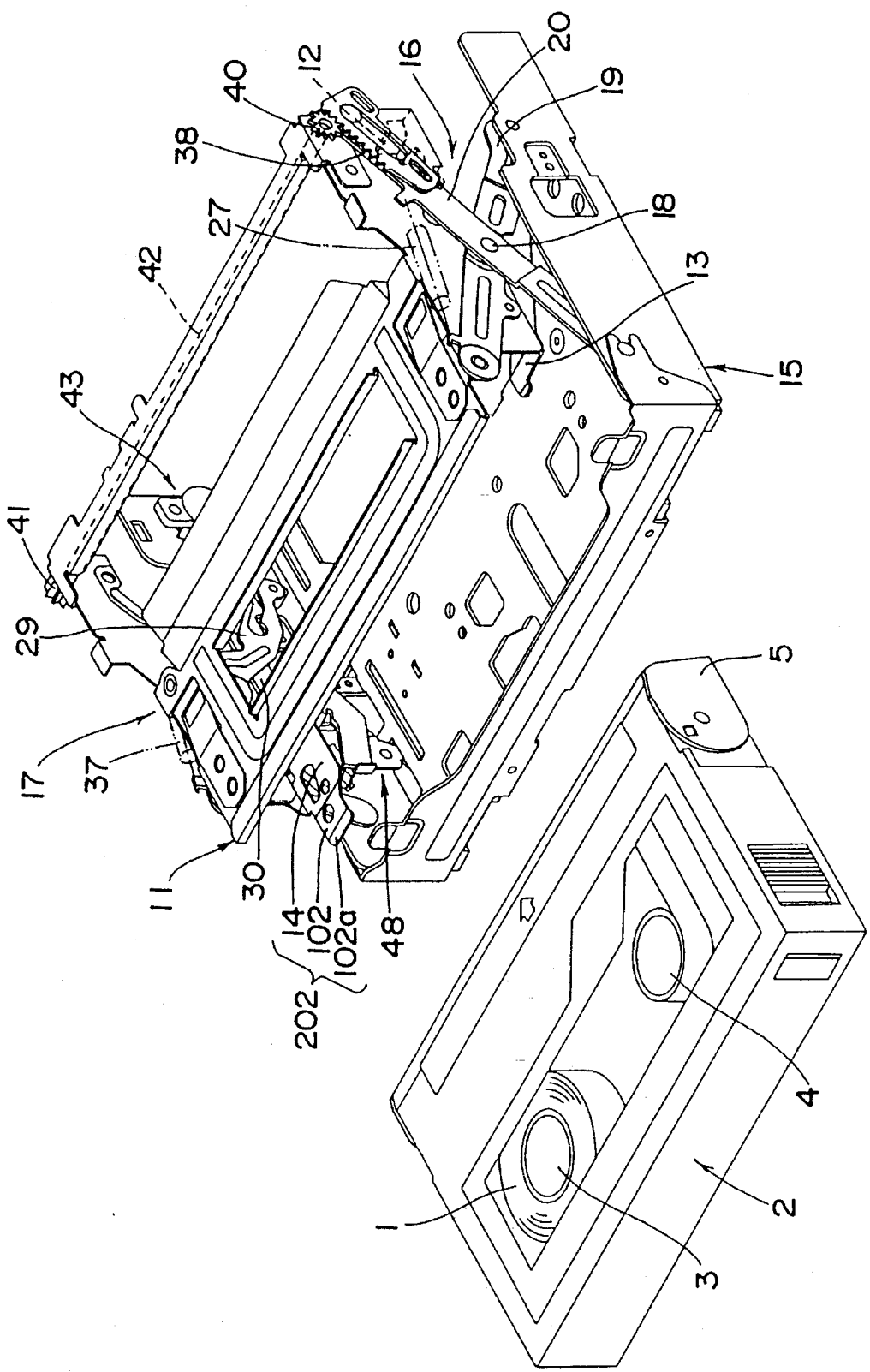
FIG. 1 is a schematic perspective view of the cassette case containing portion.
Figure 2:
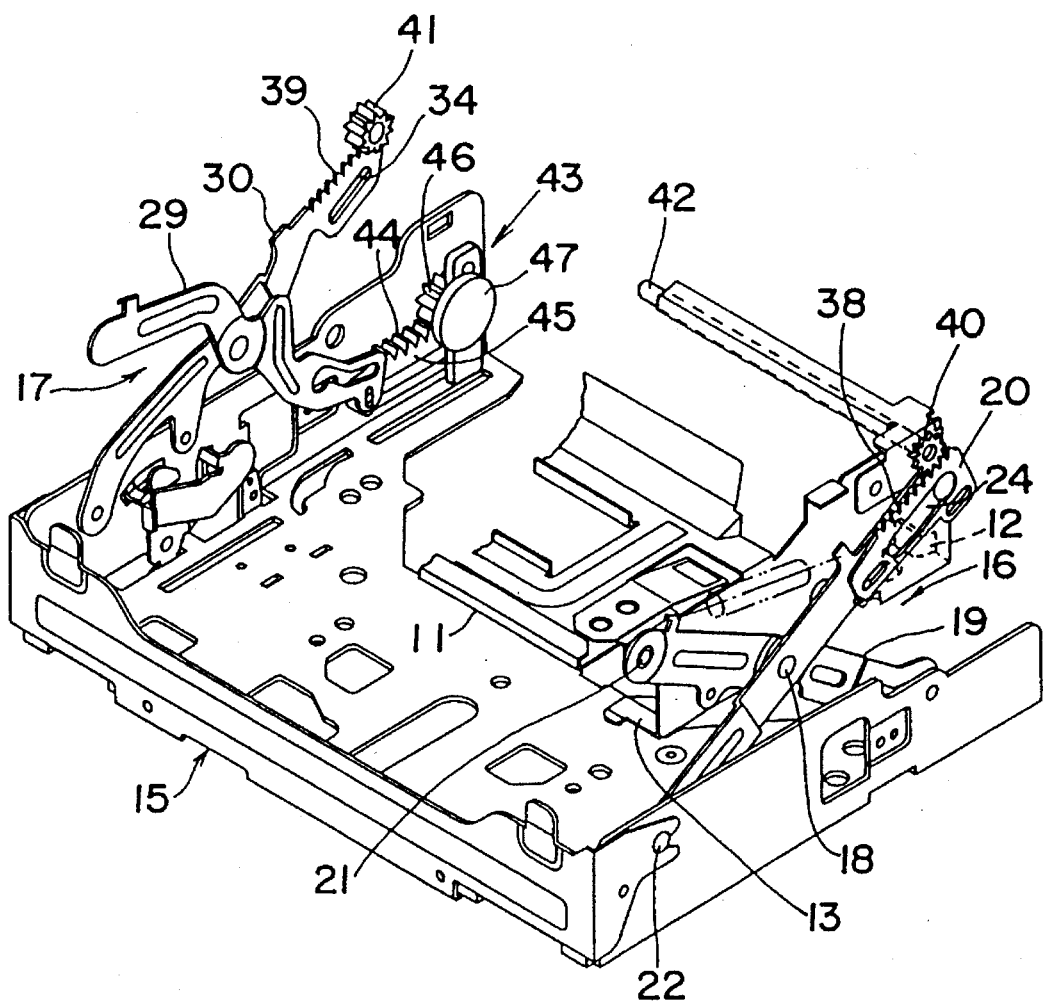
FIG. 2 is a schematic perspective view of the slide chassis.
Figure 3:
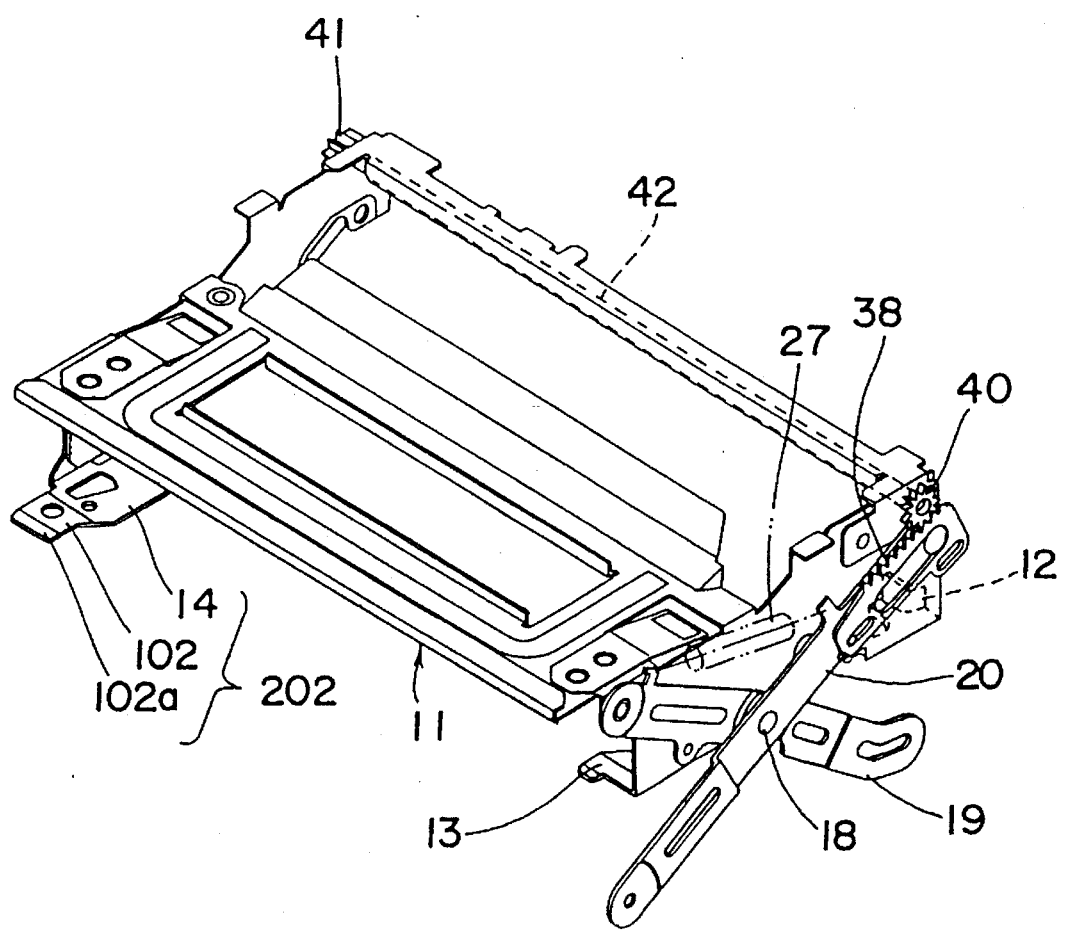
FIG. 3 is a schematic perspective view of the cassette holder.

As shown in FIG. 1, a magnetic tape 1 is wound around a feed reel 3 and a winding reel 4 and encased in a box-type in a cassette case 2. The magnetic tape 1 is exposed for reading by opening a front cover 5 upward.

Figure 4:
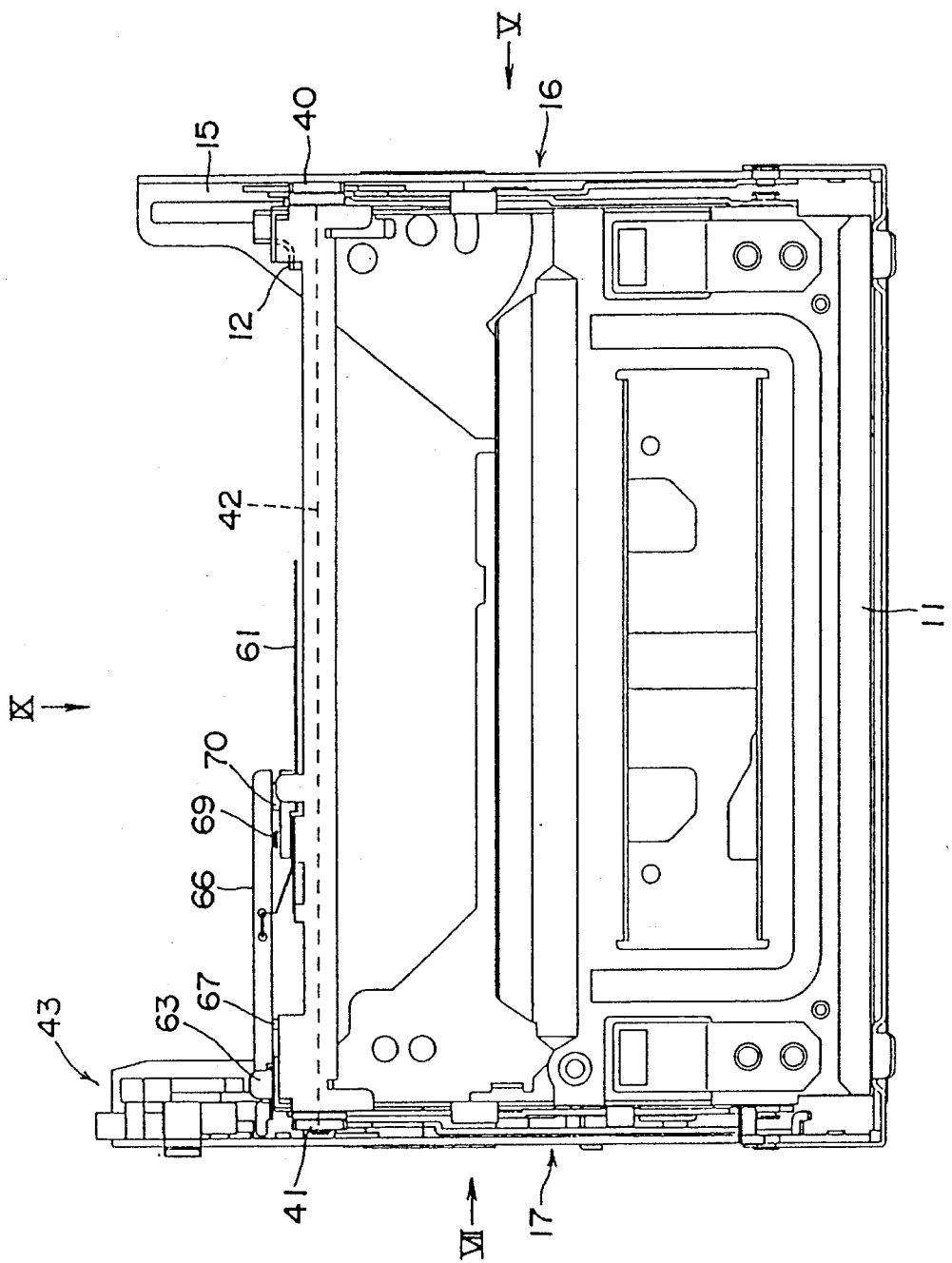
FIG. 4 is a schematic plan view of the cassette case containing portion.
Figure 5:
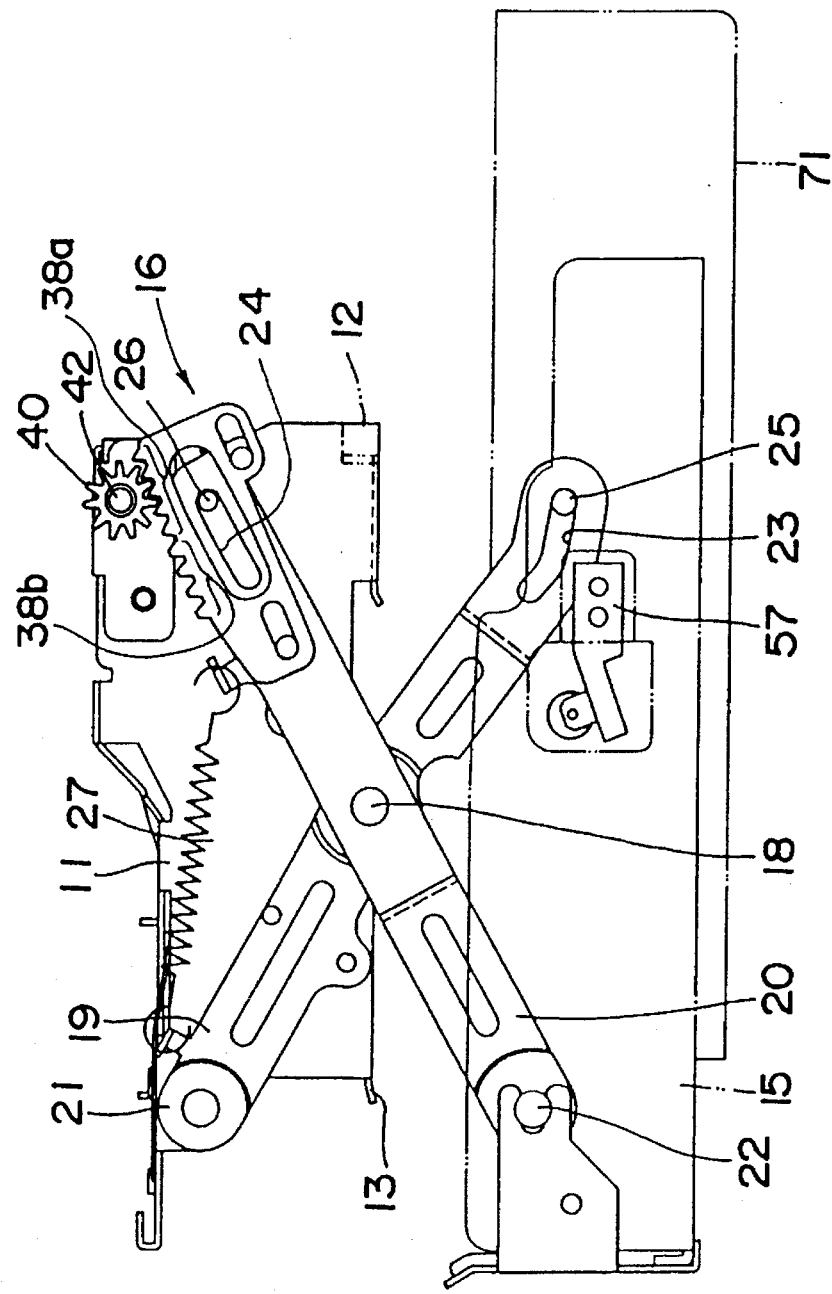
FIG. 5 is a schematic sectional view of the cassette case at the ascending position as viewed from line V in FIG. 4.
Figure 7:
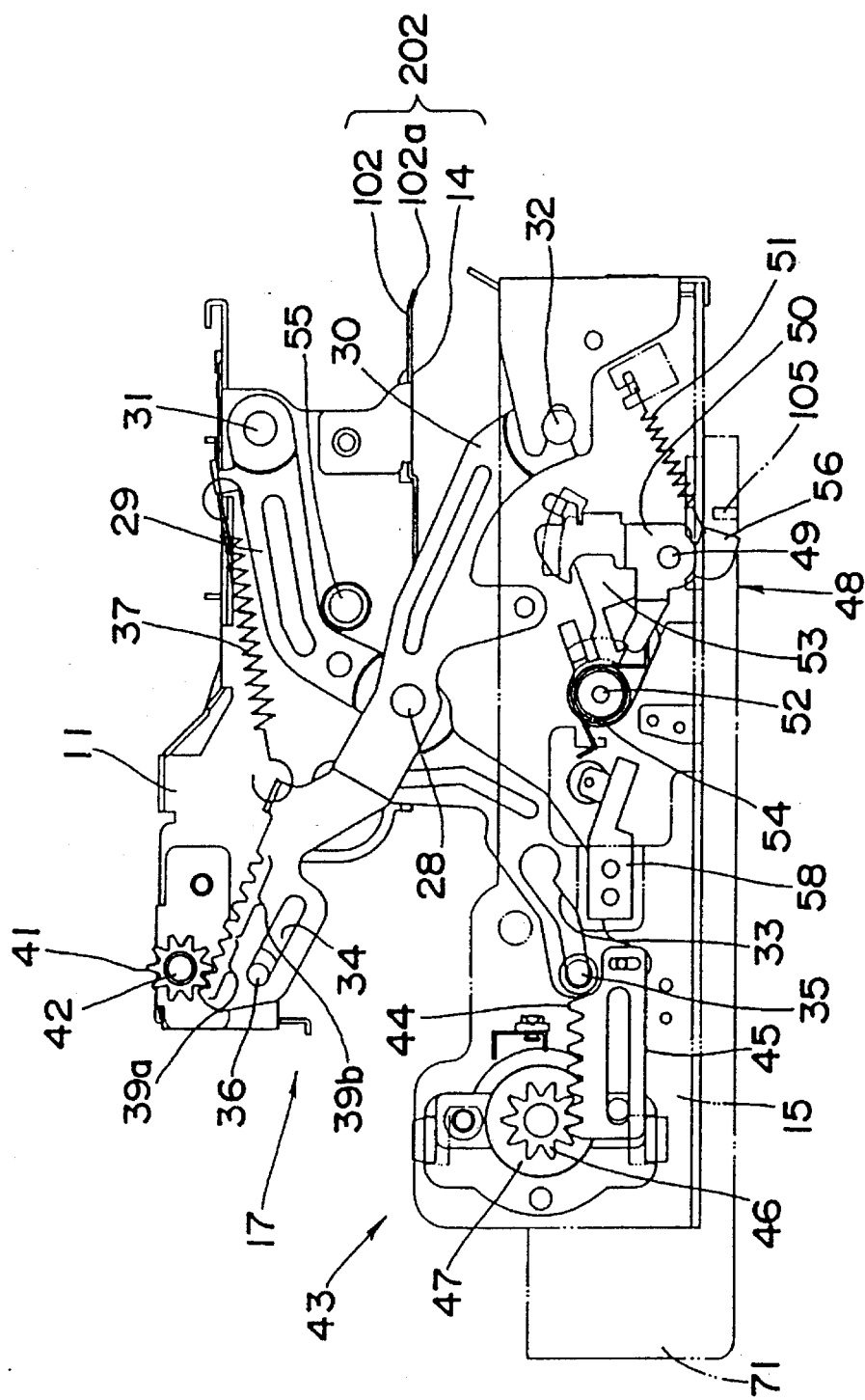
FIG. 7 is a schematic sectional view of the cassette case at the ascending position as viewed from line VII in FIG. 4.

As shown in FIGS. 1 to 5 and FIG. 7, a cassette holder 11 is box-formed with openings at the front and rear, and the cassette case can be inserted from the front opening (at the left side in FIG. 5, and the right side in FIG. 7). A slide chassis 15 is box-formed with an opening at the top, and the cassette holder 11 can be vertically moved relative to the slide chassis 15 with the surfaces of the cassette case being movable in the horizontal direction by moving mechanisms 16 and 17 provided at the right and left sides (both sides of the vertical moving direction).

Lower portions of both sides of the cassette holder 11 are formed with supporting portions 13 and 14 for supporting the cassette case 2, and the front side (opening for insertion) of the supporting portion 14 is provided with a tip portion 102. A corner portion 102a directing to the outside of the opening is formed at the tip of the tip portion 102, and insertion of the cassette case 2 is guided by the tip portion 102.

The supporting portions 13 and 14 are made of aluminum, and the tip portion 102 including the corner portion 102a of the supporting portion 14 is formed of stainless steel or other structure which is higher in strength than aluminum. The tip portion 102 is joined by caulking with the supporting portion 14, and the supporting portion 14 and the tip portion 102 form a guide member 202.

Therefore, the tip portion 102 of the supporting portion 14 is maintained at a high rigidity with a small plate thickness. As a result, the supporting portion 14 will not deform when the cassette case 2 is inserted, with a small increase in weight compared to a case where a reinforcing plate is provided.

A stopper 12 for regulating the position of the cassette case 2 is disposed at the rear portion (rear end of cassette case 2 insertion). The stopper 12 is formed by drawing the rear end of the supporting portion 13.

Forming the stopper 12 by drawing the supporting portion 13 considerably improves its strength without increasing the weight. Therefore, the stopper 12 will not deform even when the cassette case 2 is repeatedly contacted against the stopper 12, thereby consistently achieving positive positioning.

Then, one moving mechanism 16 will be described with reference to FIGS. 5 and 6.

As shown in the Figures, a pair of arms 19 and 20 are connected rotatably to each other through an intermediate connecting shaft 18, and extend between the cassette holder's front end and rear end. A front end of the individual arm 19 is supported on the cassette holder 11 by a supporting shaft 21, and the front end of the arm 20 is supported on the slide chassis 15 by a supporting shaft 22. Furthermore, rear end of the individual arm 19 is supported on the slide chassis 15 by a slot 23 and a supporting shaft 25, and the rear end of the arm 20 is supported on the cassette holder 11 by a slot 24 and a supporting shaft 26. Top ends of the arms 19 and 20, above the connecting shaft 18, are connected by a spring 27 (tension spring), and the arms 19 and 20 are urged to a rising direction by the force of the spring 27.

Next, the other moving mechanism will be described with reference to FIGS. 7 and 8.

As shown in the Figures, a pair of arms 29 and 30 are connected rotatably to each other through an intermediate connecting shaft 28. The front end of the arm 29 is supported on the cassette holder 11 by a supporting shaft 31, and the front end of the arm 30 is supported on the slide chassis 15 by a supporting shaft 32. Furthermore, the rear end of the arm 29 is supported on the slide chassis 15 by a slot 33 and a supporting shaft 35. With respect to the arm 30, the rear end is supported on the cassette holder 11 by a slot 34 and a supporting shaft 36. Top ends of the connecting shafts 28 of the arms 29 and 30 are connected by a spring 37 (tension spring), and the arms 29 and 30 are urged to a rising direction by the force of the spring 37.

By the function of the arms 19 and 20 and the arms 29 and 30 of the moving mechanisms 16 and 17, the cassette holder 11 is vertically moved while maintaining its horizontal position as shown in FIGS. 5 to 8.

The moving mechanisms of the present invention are adapted to operate at almost the same speeds. This will be described below.

As shown in FIGS. 5 to 8, racks 38 and 39 are formed at top ends of the arms 20 and 30 of the moving mechanisms 16 and 17. Furthermore, as shown in FIGS. 1, 3, and 4 to 9, pinions 40 and 41 are rotatably disposed at the rear portion of the cassette holder 11. The pinion 40 engages with the rack 38 of the arm 20, and the pinion 41 engages with the rack 39 of the arm 30. A connecting rod 42 is rotatably supported on the cassette holder 11, and the pinions 40 and 41 are mounted individually to both ends of the connecting rod 42. The pinions 40 and 41 are integrally rotated by the connecting rod 42.

Therefore, during horizontal movement of the cassette holder 11 by the moving mechanisms 16 and 17, when the individual arms 20 and 30 rotate, the pinions 40 and 41 are rotated through the racks 38 and 39. Since the pinions 40 and 41 are connected by the connecting rod 42, they rotate in synchronization to operate the right and left moving mechanisms 16 and 17 at almost the same speeds. Since the rear ends of the arms 20 and 30 of the moving mechanisms 16 and 17 (i.e. the sides where the racks 38 and 39 are formed) are connected to the cassette holder 11 by the slots 24 and 34 and the supporting shafts 26 and 36, the racks 38 and 39 rotate and slide to acceleratingly rotate the pinions 40 and 41. As a result, even when different forces are applied to the moving mechanisms 16 and 17 (i.e. when the cassette holder is pushed in by applying a force at only one side of the cassette holder 11) the moving mechanism 16 and 17 positively operate in synchronization to vertically move the cassette holder 11.

On the other hand, the moving mechanism 17 is provided with a lock mechanism 48 as a holding mechanism which holds the cassette holder 11 in a descending condition where the arms 29 and 30 are in declining positions.

The lock mechanism 48 will be described.

Figure 8:
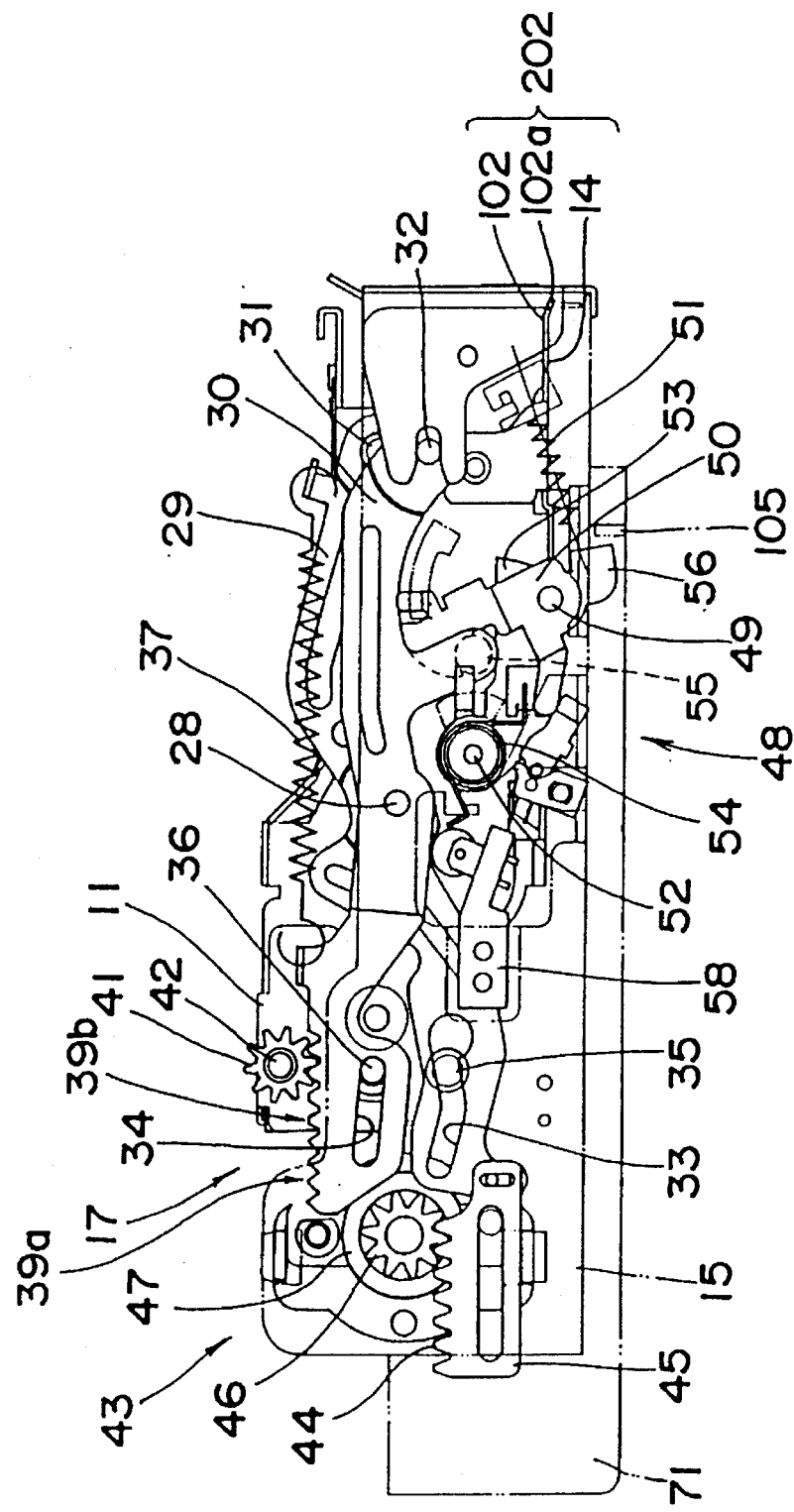
FIG. 8 is a schematic sectional view of the cassette case at the descending position as viewed from line VII in FIG. 4.

As shown in FIGS. 7 and 8, on the slide chassis 15, a hook 50 is rotatably mounted on a shaft 49 at the side portion of the moving mechanism 17 side and urged counter-clockwise by a spring 51 disposed between the side portion and the slide chassis 15. Further, a regulating plate 53 is rotatably mounted adjacent to the hook 50 by a shaft 52 and urged clockwise by a spring 54, and the tip portion of the regulating plate 53 contacts against the hook 50, thereby rotating the hook 50 against the urging force of the spring 51 and maintaining it at a release position (the position shown in FIG. 7). On the other hand, a downward tensioning portion is integrally formed on the arm 29, and a stop pin 55 is mounted on the tensioning portion. Further, a lower projection 56 is integrally formed on the hook 50, and a release lever 105 is formed on a base chassis 71 which slidably supports the slide chassis 15.

Therefore, when the cassette holder 11 shown in FIG. 7 is moved down from the ascending position (arms 29 and 30 at rising positions), the arms 29 and 30 decline and the stop pin 55 moves down. Then, the stop pin 55 contacts the regulating plate 53 to press it down against the urging force of the spring 54. As a result, the hook 50, which has been maintained at the release position by the regulating plate 53, is rotated counter-clockwise by the urging force of the spring 51. Therefore, as shown in FIG. 8, the hook 50 engages with the stop pin 55 to prevent the rising of the arm 29, and the cassette holder 11 is bound at the descending position (arms 29 and 30 at the declining positions). On the other hand, when the projection 56 of the hook 50 contacts the release lever 105 of the base chassis 71, the hook 50 is rotated counter-clockwise against the urging force of the spring 51 to release engagement with the stop pin 55. Then, the arms 29 and 30 rise due to the urging force of the spring 37, and the cassette holder 11 moves up.

In FIGS. 5 to 8, the numerals 57 and 58 indicate detection switches for detecting declining condition of the individual arms 19 and 20, and 29 and 30, of the moving mechanisms 16 and 17 (i.e. the descending condition of the cassette holder 11).

Since the lock mechanism 48 is provided only at the moving mechanism 17 side, there is a danger that a difference in holding force occurs between the right and left sides when the cassette holder 11 is moved down, and the moving mechanism 16 side of the cassette holder 11 tends to become unstable. This would be prevented by staggering the engaging phase of the pinions 40 and 41 and utilizing a twisting force to hold the cassette holder 11 horizontally during moving down. However, in this case, the cassette holder 11 becomes inclined when it is moved up, impairing the appearance.

To prevent this, an acceleration mechanism is provided at the moving mechanism 16 side. The acceleration mechanism will be described below.

The pinion 40 at the moving mechanism 16 side (the side having no holding mechanism) has 11 teeth, whereas the pinion 41 at the moving mechanism 17 side has 10 teeth. By increasing the number of teeth of the pinion 40, the moving speed of the cassette holder 11 at the moving mechanism 16 side is increased.

Therefore, the moving mechanism 16 side of the cassette holder 11 is prevented from coming up at the descending end position, thereby positively holding both sides of the cassette holder 11 at the descending end.

On the other hand, as shown in FIGS. 5 to 8, the racks 38 and 39 engaging with the pinions 40 and 41 when the cassette holder 11 is moving up differ in tooth thickness from the racks 38 and 39 engaging with the pinions 40 and 41 when the cassette holder 11 is moving down. That is, teeth 38a and 39a of the racks 38 and 39 engaging with the pinions 40 and 41 when the cassette holder 11 is moving up are thicker than teeth 38b and 39b of the racks 38 and 39 engaging with the pinions 40 and 41 when the cassette holder 11 is moving down. The tooth foot for all of teeth 38a and 39a and teeth 38b and 39b are in line with each other, but differ in the pitch line position.

Therefore, when the cassette holder 11 moves down, backlash between the pinions 40 and 41 and the racks 38 and 39 is decreased. Backlash between the pinions 40 and 41 and the racks 38 and 39 is removed by the springs 27 and 37.

Since the tooth thicknesses are gradually increased between the teeth 38a and 39a and the teeth 38b and 39b of the racks 38 and 39, smooth vertical movement of the cassette holder 11 is achieved.

Furthermore, as described above, the springs 27 and 37 are provided on the arms 19 and 20 and the arms 29 and 30 of the right and left moving mechanisms 16 and 17, and vertical movement of the cassette holder 11 is achieved by the urging force of the springs 27 and 37. Since the urging force of the springs 27 and 37 is capable of moving up the cassette holder 11, shock or vibration may occur at the ascending end of the cassette holder 11. Therefore, a damper mechanism 43 as a damping member is provided to reduce such shock and vibration and moderately stop the cassette holder 11.

The damper mechanism 43 will be described.

As shown in FIGS. 7 and 8, on the slide chassis 15, a resin-made slide member 45 as a connecting member having a rack 44 formed at the upper portion is provided at the rear of the side of the moving mechanism 17 side (rear side of the cassette holder 11). The slide member 45 is supported to be movable to the front and rear (right and left in FIGS. 7 and 8), with one end supported (connected) to the rear end of the arm 29.

An oil damper 47 is disposed at the inside of the slide chassis, and a resin-made pinion 46 is mounted on a rotary portion of the oil damper 47. The pinion 46 engages with the rack 44 of the slide member 45, and movement of the slide member 45 is moderated by the oil damper 47.

When the cassette holder 11 is moved up by the moving mechanism 17, the arms 29 and 30 are rotated in the rising direction by the urging force of the spring 37. At this moment, the rear end of the arm 29 moves to the front along with the slide member 45 to rotate the pinion 46 through the rack 44. The pinion 46 is rotated moderately by the function of the oil damper 47 to moderate the movement of the slide member 45, and the cassette holder 11 stops moderately without shock or vibration at the ascending end.

Since the damper mechanism 43 is disposed on the slide chassis 15 at the rear of the moving mechanism 17, it is unnecessary to increase the size of the cassette holder 11 and increase the width of the slide chassis 15.

Furthermore, since the arm 29 of the moving mechanism 17 and the pinion 46 of the oil damper 47 are connected through the slide member 45, which allows the tooth width of the pinion 46 and the rack 44 to be increased, viscosity of the oil damper is increased, thereby preventing the pinion 46 and the rack 44 from being damaged and achieving a lightweight construction and a cost reduction.

Figure 9:
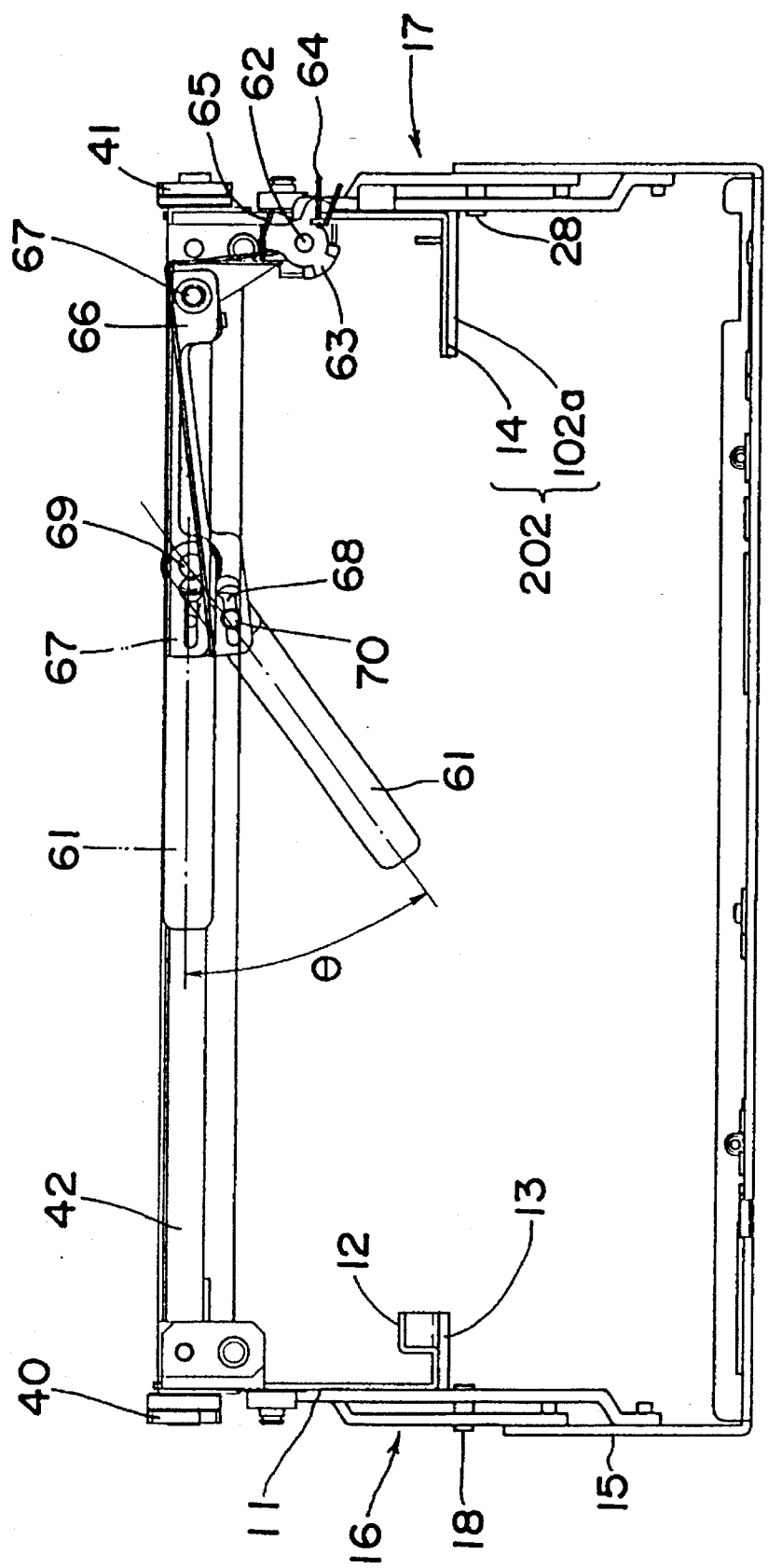
FIG. 9 is a schematic sectional view as viewed from line IX in FIG. 4.

Further, as shown in FIGS. 4 and 9, the cassette holder 11 of the present embodiment is provided with a tape protector 61. The cover 5 of the cassette case 2 is opened when the cassette holder 11 containing cassette case 2 is moving down. However, during this operation, the magnetic tape 1 may adhere to the rear side of the cover 5 due to static electricity. In such a case, the magnetic tape 1 is brought to the opposite side beyond the rotary head drum, and is not loaded properly. The tape protector 61 is to prevent the magnetic tape 1 from running on the rotary head drum.

A rotary member 63 is mounted at the rear portion of the moving mechanism 17 side of the cassette holder 11 by a supporting shaft 62, two projection pieces 64 and 65 are integrally formed on the outer peripheral surface of the rotary member 63, and the rear end of the arm 29 of the moving mechanism 17 is able to contact against the one projection piece 64. An L-formed operation member 66 is rotatably supported adjacent to the rotary member 63 by a shaft 6. One end extending beneath the operation member 66 is capable of contacting against the one projection piece 65, and a slot 68 is formed at the other end which extends horizontally. Furthermore, at the rear of the cassette holder 11, one end of the tape protector 61 is rotatably mounted by a supporting shaft 69 at a position shifted by a predetermined amount from the center to the moving mechanism 17 side (right side in FIG. 9), a connecting pin 70 is mounted at a position shifted from the supporting shaft 69 to the other end side of the tape protector 61, and the connecting pin 70 engages with the slot 68 of the operation member 66.

Figure 10:
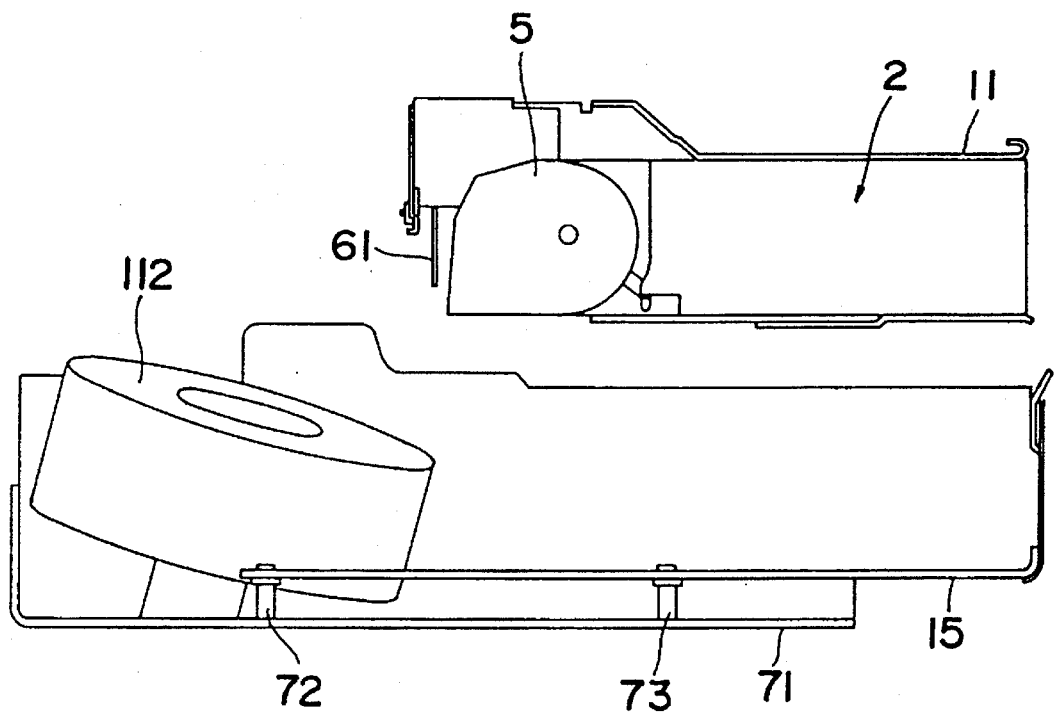
FIG. 10 is a schematic view for explaining the positional relation between the cassette case and the rotary head drum.

Therefore, when the cassette holder 11 holding the cassette case 2 is at the ascending position, the cover 5 of the cassette case 2 is closed as shown in FIGS. 9 and 10. On the other hand, the tape protector 61 is directed downward by a predetermined angle theta (θ), and the tip of the tape protector 61 is at the outer peripheral surface of a rotary head drum 112 disposed on the base chassis 71 and nearly at the center in the radial direction.

Figure 11:
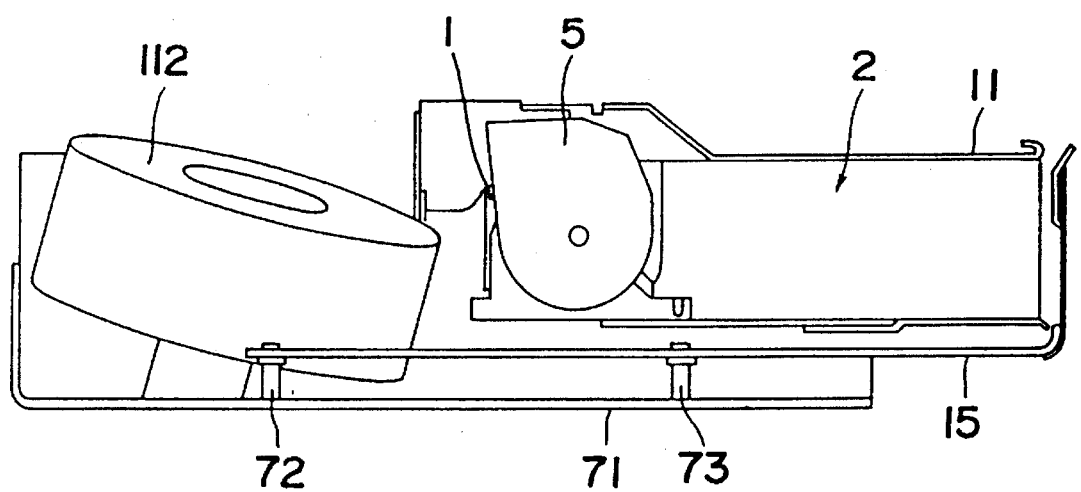
FIG. 11 is a schematic view for explaining the positional relation between the cassette case and the rotary head drum.

When the cassette holder moves down from the above condition, as shown in FIGS. 9 and 11, the cover 5 of the cassette case 2 is opened by a release mechanism (not shown) to expose the magnetic tape 1. The arms 29 and 30 of the moving mechanism 17 decline, and the rear end of the arm 29 contacts against the projection piece 64 of the rotary member 63 to gradually rotate it counter-clockwise in FIG. 9. Then, the projection piece 65 of the rotary member 63 contacts against one end of the operation member 66 to operate (move up) the other end, moving up the tape protector 61 along with downward movement of the cassette holder 11. Ascending of the tape protector 61 is carried out with a delay from the opening operation of the cover 5 of the cassette case 2, and the tape protector 61 completes ascending immediately before the magnetic tape 1 exposed from the cassette case 2 opposes the outer peripheral surface of the rotary head drum 112.

To set the cassette case 2 in position in the 8-mm video apparatus main unit, as shown in FIG. 1, the cassette case 2 is inserted from the front into the cassette holder 11 at the ascending position. When the cassette holder 11 is pressed down from the eject (ascending) position shown in FIGS. 5 and 7, the individual arms 19 and 20 and 29 and 30 of the moving mechanisms 16 and 17 decline, and the cassette holder 11 containing the cassette case 2 is moved to the descending position. The cassette holder 11 containing cassette case 2 can be moved down while maintaining a horizontal orientation. The arms 20 and 30 of the right and left moving mechanisms 16 and 17 are synchronized by the connecting rod 42 which operates the racks 38 and 39 and the pinions 40 and 41 to move the right and left moving mechanisms 16 and 17 in synchronization with each other, thereby preventing the cassette holder 11 from twisting or inclining during descending.

Since the number of teeth of the pinion 40 is one more than the pinion 41, the moving mechanism 16 side of the cassette holder 11 will not come up at the descending end. Furthermore, in the racks 38 and 39, since the teeth 38b and 39b engaging with the pinions 40 and 41 during descending of the cassette holder 11 are thinner, backlash between the pinions 40 and 41 and the racks 38 and 39 at the descending end of the cassette holder 11 is reduced. Therefore, the cassette holder 11 will not twist or incline during descending.

Figure 6:
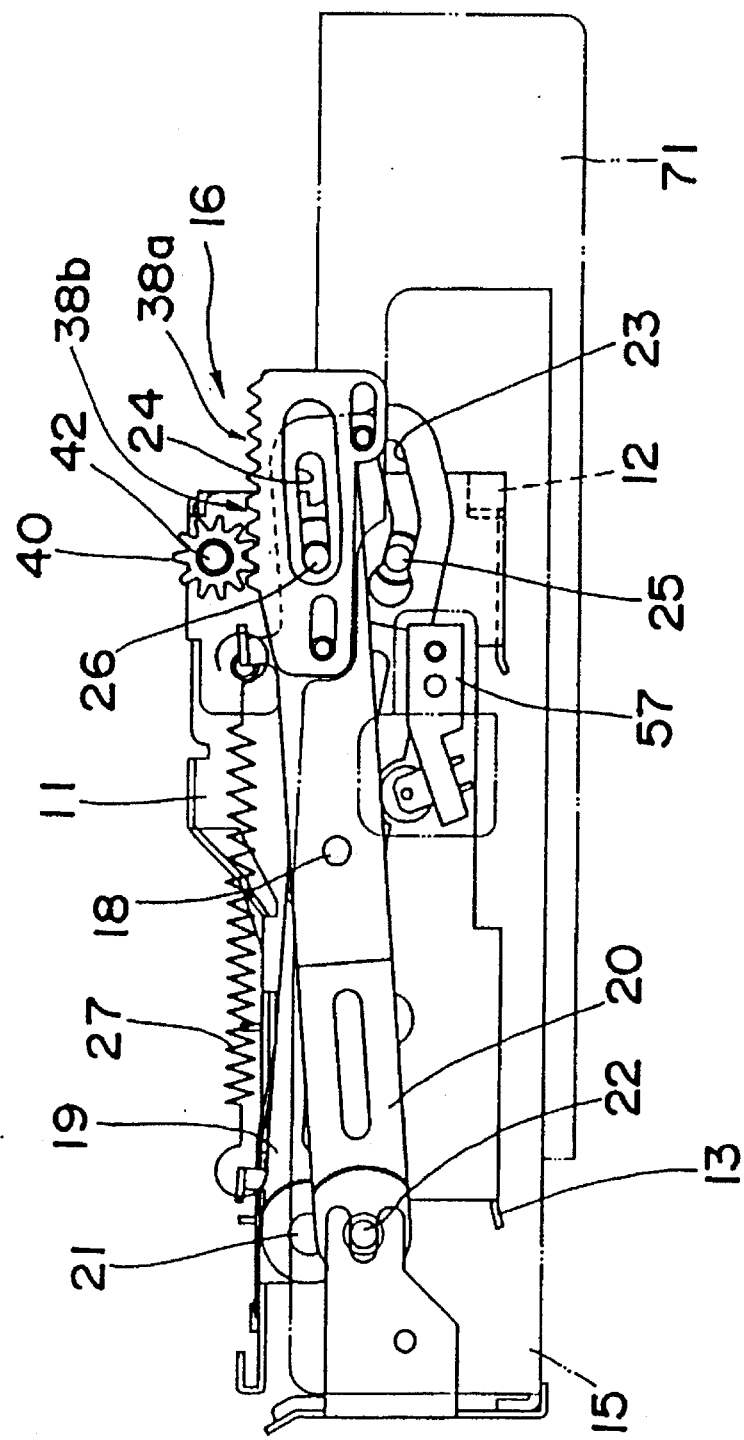
FIG. 6 is a schematic sectional view of the cassette case at the descending position as viewed from line V in FIG. 4.

As shown in FIGS. 6, 8, and 9, when the cassette holder is moved down, the cassette holder 11 is bound at the descending position by the lock mechanism 48. That is, when the arms 29 and 30 of the moving mechanism 17 decline, the stop pin 55 moves down to engage with the hook 50. As a result, the arm 30 is prevented from rising, and the cassette holder 11 is bound at the descending position. Movement of the cassette holder 11 to the descending position is detected by the detection switches 57 and 58.

When the cassette holder 11 is at the ascending position, the cover 5 of the cassette case 2 is closed as shown in FIGS. 9 and 10, and the tape protector 61 is positioned near the center in the radial direction with the tip portion located at the periphery of the rotary head drum 112. When the cassette holder 11 moves down, as shown in FIGS. 9 and 11, the cover 5 of the cassette case 2 is opened to expose the magnetic tape 1, and the tape protector 61 is moved up while the cassette holder 11 moves down. At this moment, moving up operation of the tape protector 61 is carried out with a delay from the operation of the cover 5 of the cassette case 2, and the tape protector 61 is moved up to the horizontal position at the descending position of the cassette holder 11 where the magnetic tape 1 exposed from the cassette case 2 opposes the outer peripheral surface of the rotary head drum 112.

Therefore, when the cassette holder 11 (cassette case 2) moves down, and even when the magnetic tape 1 adheres to the backside of the cover 5 of the cassette case 2 due to static electricity generated in association with operation of the cover 5, since the tape protector 61 is located between the magnetic tape 1 and the rotary head drum 112, the magnetic tape 1 is prevented from running on the rotary head drum 112.

When the cassette holder 11 completely moves down and is bound at the present position by the lock mechanism 48, the slide chassis 15 is moved to the play position by a drive mechanism (not shown), and the cassette case 2 is loaded. At the play position, the magnetic tape 1 is pulled out from the cassette case 2, and run for recording or reproduction.

When recording or reproduction of the magnetic tape 1 completes and the tape 1 stops running, loading of the cassette 2 is released, and the slide chassis 15 moves to the original position (eject position). When the slide chassis 15 moves to the eject position, as shown in FIGS. 6 and 8, the projection of the hook 50 comes in contact against the release lever 105 of the base chassis 71, and the hook 50 rotates counter-clockwise against the urging force of the spring 51 to release engagement with the stop pin 55. Then, the arms 29 and 30 of the moving mechanism 17 rise due to the urging force of the spring 37, the arms 19 and 20 of the moving mechanism 16 rise due to the urging force of the spring 27, and the cassette holder 11 moves up.

When the cassette holder 11 is moved up by the moving mechanisms 16 and 17, the cassette holder is moved up by the urging force of the springs 27 and 37. At this moment, when the arm 29 rises, its rear end moves to the front along with the slide member 44 to rotate the pinion 46 through the rack 44, rotation of the pinion 46 is moderated by the function of the oil damper 47 to reduce shocks and vibration at the ascending end of the cassette holder 11, and the cassette holder 11 stops moderately. After the cassette holder 11 moves up, the cassette case 2 is taken out from the cassette holder 11.

In the above-described moving mechanisms of the cassette holder 11, the pinions 40 and 41 are rotated by rotation of the individual arms 20 and 30 through the racks 38 and 39, and the pinions 40 and 41 rotate in synchronization with each other due to the connecting rod 42, thereby preventing the cassette holder 11 from twisting or inclining during ascending. Furthermore, since the racks 38 and 39 rotate and slide to turn the pinions 40 and 41, rotation of the pinions 40 and 41 is increased. Therefore, the moving mechanisms 16 and 17 positively synchronize with each other, and the cassette holder 11 is vertically moved while always maintaining its horizontal condition.

Since the pinion 40 has more teeth than the pinion 41, the moving mechanism 16 is prevented from coming up at the descending end position due to right and left twisting of the cassette holder 11. Further, the teeth 38$b$ and 39$b$ of the racks 38 and 39 are thinner than the teeth 38$a$ and 39$a$, backlash between the pinions 40 and 41 and the racks 38 and 39 when the cassette holder 11 is moved down can be reduced.

The cassette holder moving mechanisms of the present invention, in a magnetic recording and reproduction apparatus where the cassette holder is supported to be vertically movable relative to the slide chassis by the two moving mechanisms, has the acceleration mechanism at the rack and pinion mechanism disposed at the side having no holding mechanism, thereby preventing the cassette holder from coming up at the descending end position. As a result, stable holding force is obtained on both sides of the cassette holder.

Furthermore, since the racks engaging with the pinions at the descending end position of the cassette holder are greater in tooth thickness than the racks engaging with the pinions at the ascending end position of the cassette holder, backlash between the racks and the pinions at the descending end of the cassette holder can be reduced. As a result, a dead zone at the descending end of the cassette holder is reduced, and improved operability is obtained.

What is claimed is:

1. A magnetic recording and reproduction apparatus having a main unit with a base chassis, and a cassette holder defining front, rear, and opposite sides and adapted to hold a box-type cassette case having a wound magnetic tape, comprising:

a slide chassis slidably provided in said main unit for holding said cassette holder in a manner such that said cassette holder is capable of being vertically moved between an ascending position and a descending position, wherein an orientation of said cassette holder in said ascending position is substantially parallel to an orientation of said cassette holder in said descending position;

a first moving mechanism and a second moving mechanism which are operatively connected between said cassette holder and said slide chassis and are disposed at respective opposite sides of said cassette holder, wherein said first moving mechanism and said second moving mechanism guide said cassette holder between said ascending position and said descending position;

connecting means for synchronizingly connecting said first and second moving mechanisms, wherein said connecting means ensures that said cassette holder remains substantially parallel to said slide chassis;

holding means for preventing said first moving mechanism from moving said cassette holder to said ascending position when said cassette holder is in said descending position; and acceleration means for accelerating a vertical movement of said second moving mechanism relative to a vertical movement of said first moving mechanism, wherein said acceleration means reduces an unstabilizing force generated by said holding means.

2. The magnetic recording and reproduction apparatus having a cassette holder as set forth in claim 1 wherein said first moving mechanism comprises:

a first arm and a second arm which are joined and rotatable relative to each other at a longitudinally intermediate portion, wherein each arm has longitudinally opposed ends and one end of each of said first and second arms are supported on said cassette holder and another end of each of said first and second arms are supported on said slide chassis; and first rack and pinion means disposed at said one end of said first arm.

3. The magnetic recording and reproduction apparatus having a cassette holder as set forth in claim 2 wherein said second moving mechanism comprises:

a first arm and a second arm which are joined and rotatable relative to each other at a longitudinal intermediate portion, wherein each arm has longitudinally opposed ends and one end of each of said first and second arms are supported on said cassette holder and another end of each of said first and second arms are supported on said slide chassis; and second rack and pinion means disposed at said one end of said first arm.

4. The magnetic recording and reproduction apparatus having a cassette holder as set forth in claim 3 wherein said connecting means comprises:

a connecting rod rotatably supported on said cassette holder, wherein a first pinion of said first rack and pinion means and a second pinion of said second rack and pinion means are respectively mounted to opposite ends of said connecting rod and wherein said first rack and pinion means has a first number of teeth and said second rack and pinion means has a second number of teeth.

5. The magnetic recording and reproduction apparatus having a cassette holder as set forth in claim 4, wherein said acceleration means comprises:

said first pinion and said second pinion, wherein said first pinion has a greater number of teeth than said second pinion.

6. The magnetic recording and reproduction apparatus having a cassette holder as set forth in claim 4, wherein said acceleration means comprises:

a first rack of said first rack and pinion means and a second rack of said second rack and pinion means, wherein said first rack has a lesser number of teeth than said second rack.

7. A magnetic recording and reproduction apparatus having a main unit with a base chassis, and a cassette holder defining front, rear, and opposite sides and adapted to hold a box-type cassette case having a wound magnetic tape, comprising:
- a slide chassis slidably provided in said main unit for holding said cassette holder in a manner such that said cassette holder is capable of being vertically moved between an ascending position and a descending position, wherein an orientation of said cassette holder in said ascending position is substantially parallel to an orientation of said cassette holder in said descending position and wherein a user is able to remove said cassette case from said cassette holder or place said cassette case in said cassette holder when said cassette holder is in said ascending position;
- a first moving mechanism and a second moving mechanism which are operatively connected between said cassette holder and said slide chassis and are disposed at respective opposite sides of said cassette holder,
- wherein said first moving mechanism and said second moving mechanism guide said cassette holder between said ascending position and said descending position,
- wherein said first and second moving mechanisms each comprise a first arm having first and second ends and a second arm having first and second ends,
- wherein said first and second arms are joined and rotatable relative to each other at a longitudinally intermediate portion, and
- wherein said first ends of said first and second arms are supported on said slide chassis and said second ends of said first and second arms are supported on said cassette holder; and
- connecting means for synchronizingly connecting said first and second moving mechanisms, wherein said connecting means ensures that said cassette holder remains substantially parallel to said slide chassis;
- acceleration means for accelerating a vertical movement of said second moving mechanism relative to a vertical movement of said first moving mechanism.

8. The magnetic recording and reproduction apparatus having a cassette holder as set forth in claim 7, wherein said second ends of said first and second arms respectively have first and second slots,
- wherein said opposite sides of said cassette holder respectively have first and second support shafts and said first and second arms are respectively slidably supported on said cassette holder by placing said first and second support shafts through said first and second slots,
- wherein said connecting means comprises:
  - a connecting rod;
  - first and second pinions which are disposed adjacent to said opposite sides of said cassette holder and are connected to each other via said connecting rod; and
  - first and second racks which are respectively disposed on said second ends of said first arms and which respectively engage said first and second pinions,
- wherein the respective distance between said first and second racks and said first and second slots is small so as to prevent the first and second pinions from respectively skipping teeth on the first and second racks.

* * * * *